Aug. 30, 1966  J. ABRAMSON  3,269,870
METHOD OF REMOVING LEAD PLATES FROM BATTERIES
Filed April 15, 1964
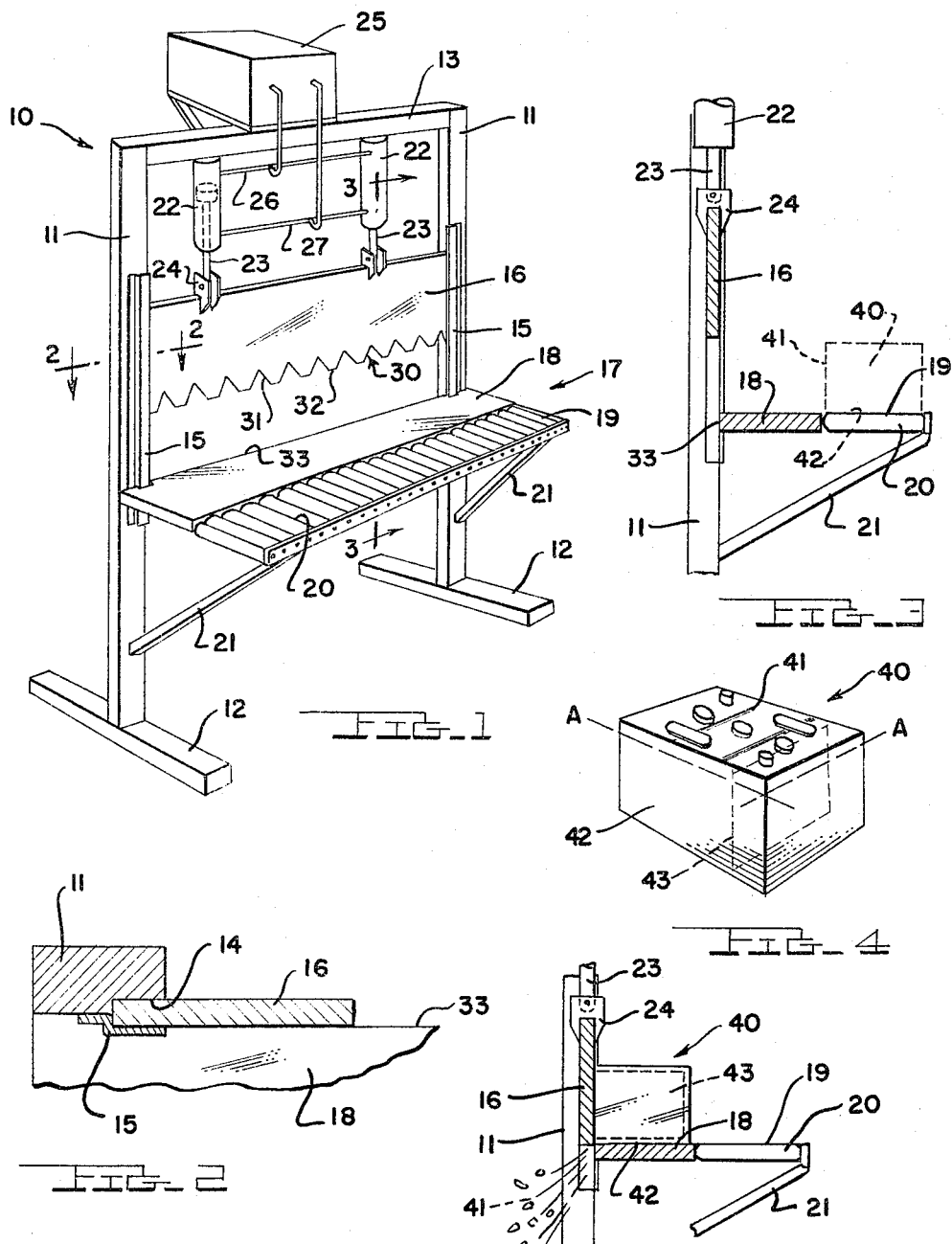
INVENTOR.
JACK ABRAMSON
BY
Cullen, Sloman & Canter
ATTORNEYS

United States Patent Office 3,269,870
Patented August 30, 1966

3,269,870
METHOD OF REMOVING LEAD PLATES
FROM BATTERIES
Jack Abramson, 13535 Helen, Detroit 12, Mich.
Filed Apr. 15, 1964, Ser. No. 359,972
1 Claim. (Cl. 136—174)

This invention relates to a method of removing lead plates from wet cell batteries, and more particularly to a method of breaking off the top of the case of a battery to permit removal of the lead plates contained therein.

Automotive-type, wet cell batteries are formed of a plastic, box-like case within which lead plates are placed for immersion in the battery fluid. The box or case is completely sealed except for openings at the top through which fluid may be added as needed. When the batteries wear out, they are replaced, and the used batteries discarded. These used batteries contain lead plates which are remelted and reused. Hence, it is a practice in salvaging lead battery plates to manually smash apart the battery case, using a sledge hammer, to remove the lead plates.

Hence, it is an object of this invention to provide a method of quickly and inexpensively removing the integral top cover of the battery case so that the remainder of the case may simply be inverted to permit the plates to drop out. Briefly, the method includes turning a battery case on its side and then, using a large flat blade, chopping off and breaking up the top of the case in one stroke, to thereby gain access to the plates.

This and other objects and advantages of this invention will become apparent upon reading the following description, of which the attached drawings form a part.

In these drawings:

FIG. 1 is a perspective view of the apparatus herein.

FIG. 2 is an enlarged fragmentary view taken in the direction of arrows 2—2 of FIG. 1.

FIG. 3 is an enlarged cross-sectional view taken in the direction of arrows 3—3 of FIG. 1.

FIG. 4 is a perspective view of a typical automotive type, wet cell battery.

FIG. 5 schematically shows the operation of chipping off and breaking up the top cover of the battery case.

*Apparatus*

The apparatus 10 comprises a rigid frame formed of vertically arranged side posts 11 having horizontal support feet 12 and an upper cross bar 13. The vertical posts are provided with vertical tracks 14 formed by vertically arranged strips 15, within which tracks are fitted the opposite vertical edges of a flat blade or plate 16. The blade or plate 16 is arranged to move up and down in the tracks.

A horizontally arranged shelf 17 is secured to the frame on one side of the blade and is formed by an inner solid shelf portion 18 and an outer roller shelf portion 19 formed of a large number of rollers 20 pivotally arranged to form a roller type surface. The shelf 17 is supported on the vertical posts by means of suitable braces 21.

Connected to the cross member 13 are a pair of conventional hydraulic cylinders 22 having piston rods 23 whose lower ends are connected by brackets 24 to the upper edge of the blade 16. A conventional, combined pump and fluid reservoir 25 is mounted on the top of the cross member 13 and hydraulic lines 26 and 27 connect the opposite ends of the hydraulic cylinders 22 to the pump.

The lower horizontal edge of the blade 16 is formed as a chopping or breaking edge 30 having a plurality of inverted V-shaped notches 31. The notches are spaced apart a sufficient distance to form flat, horizontal edge portions 32, thus forming an edge having both horizontal and angular portions.

The blade 16 is arranged to move up and down in response to movement of the piston rods 23 within the hydraulic cylinders 22, with the blade just clearing the inner edge 33 of the shelf 17.

*The batteries*

FIG. 4 illustrates a conventional automotive type, wet cell battery 40 formed of a sealed, box-like case made of rigid plastic material and having an integral top cover 41, a side wall 42 and containing vertically arranged lead plates 43. The top cover is provided with suitable covered openings through which the battery fluid may be poured and also the battery terminals.

*The method*

The object here is to remove the top cover 41 by chopping and breaking the top cover 41 to the part located just beneath the cover and shown by dotted lines A—A in FIG. 4, so that the battery plates may be removed.

The batteries 40 are placed upon the roller portion 19 of the shelf 17 and rolled along by the machine operator until he has one or more batteries positioned on the roller table. Then he pushes the batteries forward, away from him, onto the flat table portion 18 with the batteries being turned on their sides 42 so that their top covers 41 are arranged vertically (see FIG. 3). The batteries are aligned relative to the shelf edge 33 so that lines A—A are approximately lined up with the shelf edge 33, this being accomplished manually.

Then, the machine operator operates the hydraulic pump and reservoir 25 to force hydraulic fluid through the hydraulic line 26 and thereby cause the hydraulic piston rods 23 to move down, pushing the blade 16 downwardly towards the battery case. The downward stroke of the blade 16 causes the chopping edge 30 to chop off and break up the hard plastic forming the top cover of the battery until finally the blade reaches its lowest point, approximately level with the table portion 18 (see FIG. 5) at which point the battery top cover 41 has been fragmented due to the action of the notched blade edge. The fragments of the top fall on the floor.

The operator then pulls the battery case back on the roller portion 19 where the batteries are removed and carried away on a suitable conveyor (not shown). After removal from the table 17, the batteries are inverted manually, and the plates 43 simply drop out under the influence of gravity. The remaining portion of the battery case is then discarded.

This invention may be further developed within the scope of the following claim. Accordingly, it is desired that the foregoing description be read as being merely illustrative of an operative embodiment of this invention and not in a strictly limited sense.

I now claim:

A method for simultaneously removing lead plates and terminals from a wet cell, automotive type battery formed of a box-like case made of hard plastic sides, bottom and top cover through which terminals project, comprising the steps of:
- (a) placing the case upon its side so that the top cover is arranged in a vertical plane, then
- (b) positioning a flat, vertically arranged blade having a lower, blunt, horizontal edge of about the same thickness of said top cover and formed with a plurality of inverted spaced apart V-shaped notches, above and in the same vertical plane as said top cover, and
- (c) forcefully moving said blade vertically downwardly in said plane against said top cover for the full height of said vertically arranged top cover to thereby incrementally fragment and disintegrate said top cover to thus remove said cover from the case while simultaneously separating the terminals from the cover, and finally,
- (d) turning the case upside down so that the plates fall out of the open top by gravity.

References Cited by the Examiner
UNITED STATES PATENTS

| | | | |
|---|---|---|---|
| 1,284,312 | 11/1918 | Glover | 225—103 |
| 1,299,134 | 4/1919 | Crompton | 225—103 |
| 2,281,366 | 4/1942 | Metcalf | 83—369 X |
| 2,349,336 | 5/1944 | Batchelder | 225—103 |
| 2,398,275 | 4/1946 | Alpert | 136—174 |
| 2,517,362 | 8/1950 | Thompson | 83—694 |
| 2,567,542 | 9/1951 | Blake | 136—174 |
| 3,039,343 | 6/1962 | Richards | 83—369 X |
| 3,152,504 | 10/1964 | Brown | 29—426 X |
| 3,181,758 | 5/1965 | Konig | 225—103 |

CHARLIE T. MOON, *Primary Examiner.*